(12) United States Patent  
Huang

(10) Patent No.: US 7,637,468 B2  
(45) Date of Patent: Dec. 29, 2009

(54) ADJUSTABLE NOTEBOOK COMPUTER SUPPORT

(76) Inventor: Ming-Hsing Huang, No. 279, Fu-Jiann Road, Tai-Dong City (TW) 950

( * ) Notice: Subject to any disclaimer, the term of this patent is extended or adjusted under 35 U.S.C. 154(b) by 109 days.

(21) Appl. No.: 11/969,917

(22) Filed: Jan. 6, 2008

(65) Prior Publication Data

US 2009/0173866 A1  Jul. 9, 2009

(51) Int. Cl.
*F16M 13/00* (2006.01)

(52) U.S. Cl. ............... 248/421; 248/564; 248/370; 248/292.12; 108/145

(58) Field of Classification Search ........... 248/564, 248/370, 421, 274.1, 371, 372.1, 393, 394, 248/395, 396, 398; 108/145

See application file for complete search history.

(56) References Cited

U.S. PATENT DOCUMENTS

| 4,926,760 | A | * | 5/1990 | Sack | 108/145 |
| 5,402,737 | A | * | 4/1995 | Kanazawa | 108/147 |
| 6,318,695 | B1 | * | 11/2001 | Hu | 248/371 |
| 6,705,238 | B1 | * | 3/2004 | Heckert | 108/145 |
| 7,048,236 | B2 | * | 5/2006 | Benden et al. | 248/121 |

* cited by examiner

Primary Examiner—J. Allen Shriver
Assistant Examiner—Todd M. Epps
(74) Attorney, Agent, or Firm—Pai Patent & Trademark Law Firm; Chao-Chang David Pai; Jeffrey R. Ouimet

(57) ABSTRACT

An adjustable notebook computer support includes a carrier member holding a notebook computer, a base member having a sliding slot, a first link that has one end pivoted to one end of the carrier member and the other end pivoted to one end of the base member, a second link that has one end pivoted to the other end of the carrier member and the other end coupled to and movable along the sliding slot of the base member, a braking unit movable between an unlocking position for allowing adjustment of the elevation and angle of the first and second links relative to the carrier member and a locking position where the first and second links are locked to the carrier member.

3 Claims, 2 Drawing Sheets

ADJUSTABLE NOTEBOOK COMPUTER SUPPORT

BACKGROUND OF THE INVENTION

1. Field of the Invention

The present invention relates to a support structure and more particularly to an adjustable notebook computer support that allows adjustment of the elevation and tilting angle of the notebook computer supported thereon.

2. Description of the Related Art

A notebook computer has the characteristics of being light and thin. Because of the high count of its component parts and high performance speed, a notebook computer generates much heat energy during its operation. When a notebook computer is kept in close contact with the surface of the tabletop during its operation, heat will not be quickly dissipated from the notebook computer. Accumulation of heat energy will affect the normal functioning and lifetime of the notebook computer. Therefore, an extra cooler means is necessary. Further, operating a notebook computer in a horizontal position on a tabletop will soon cause pain of the user's neck, back and/or waist. Therefore, it is preferable to operate a notebook computer in a tilted position. Further, when using a notebook computer at an airport, or at any other places outside, the user may put the notebook computer directly on the lap for operation. Operating a notebook computer in this manner is neither comfortable nor conducive to dissipation of heat energy. Further, the heat produced by the notebook computer will be transferred to the user's lap, causing the user to feel uncomfortable.

SUMMARY OF THE INVENTION

The present invention has been accomplished under the circumstances in view. It is one object of the present invention to provide an adjustable notebook computer support, which supports a notebook computer at a desired elevation and tilting angle for operation, bringing comfort to the user. It is another object of the present invention to provide an adjustable notebook computer support, which facilitates dissipation of heat during the operation of the notebook computer supported thereon.

To achieve these and other objects of the present invention, the adjustable notebook computer support comprises a carrier member for holding a notebook computer; a base member, the base member having a sliding slot; a linking unit, the linking unit comprising a first link and a second link, the first link having a first end pivoted to the carrier member and a second end pivoted to one end of the base member, the second link having a first end pivoted to one end of the carrier member and a second end coupled to and movable along the sliding slot of the base member; and a braking unit movable between an unlocking position for allowing adjustment of the elevation and angle of the linking unit relative to the carrier member and a locking position where the first link and the second link are locked to the carrier member.

DETAILED DESCRIPTION OF THE PREFERRED EMBODIMENT

Figure 1:
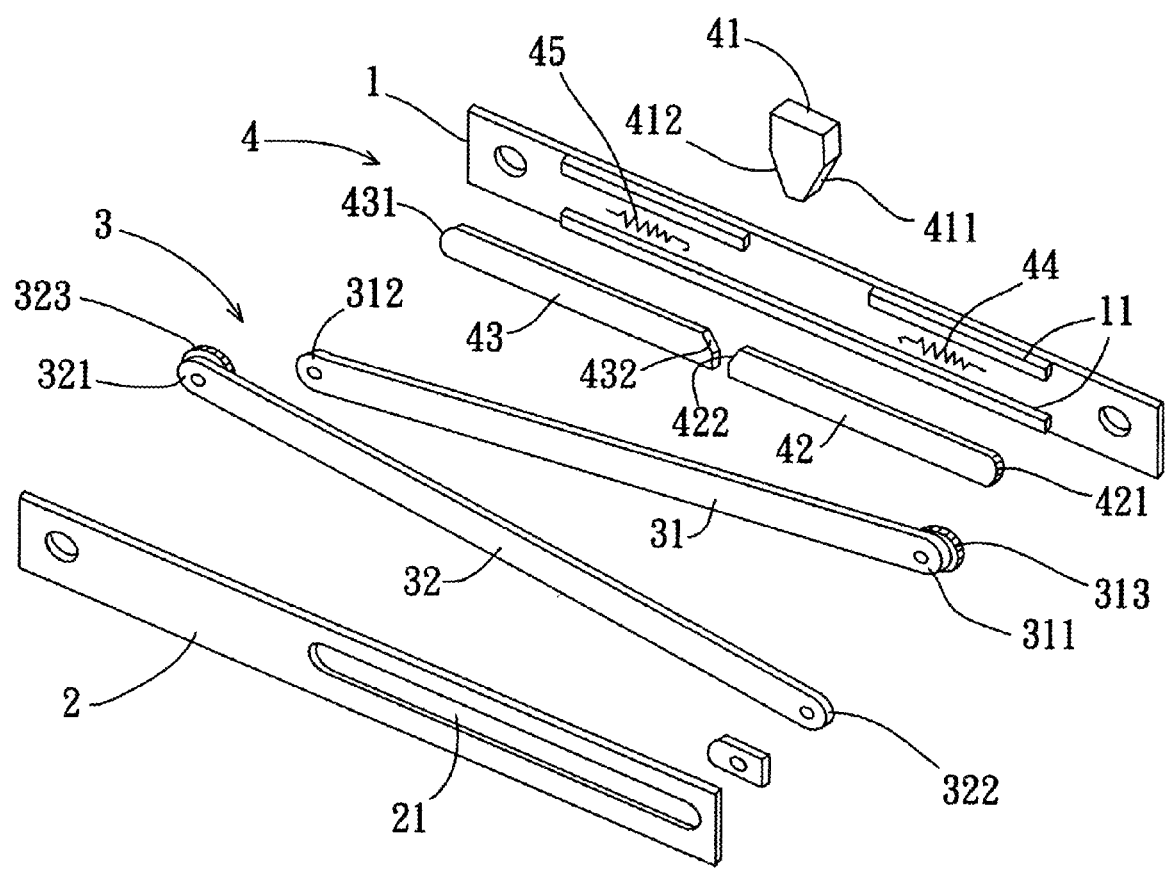
FIG. 1 is an exploded view of an adjustable notebook computer support in accordance with the present invention.
Figure 2:
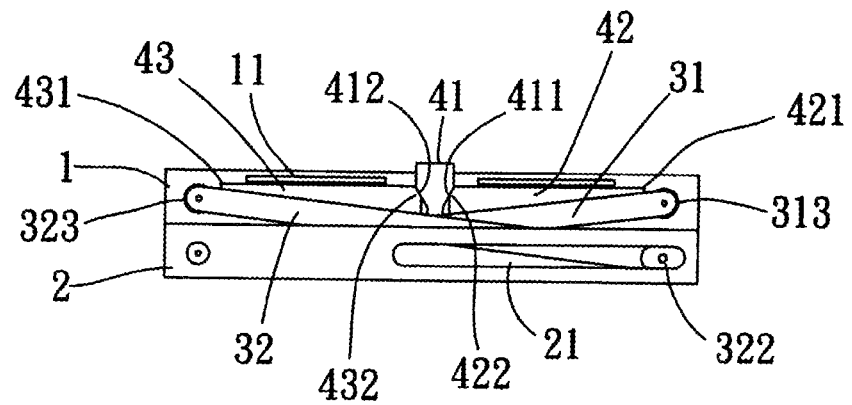
FIG. 2 is an assembly view of the present invention, showing the adjustable notebook computer support in the received condition.
Figure 3:
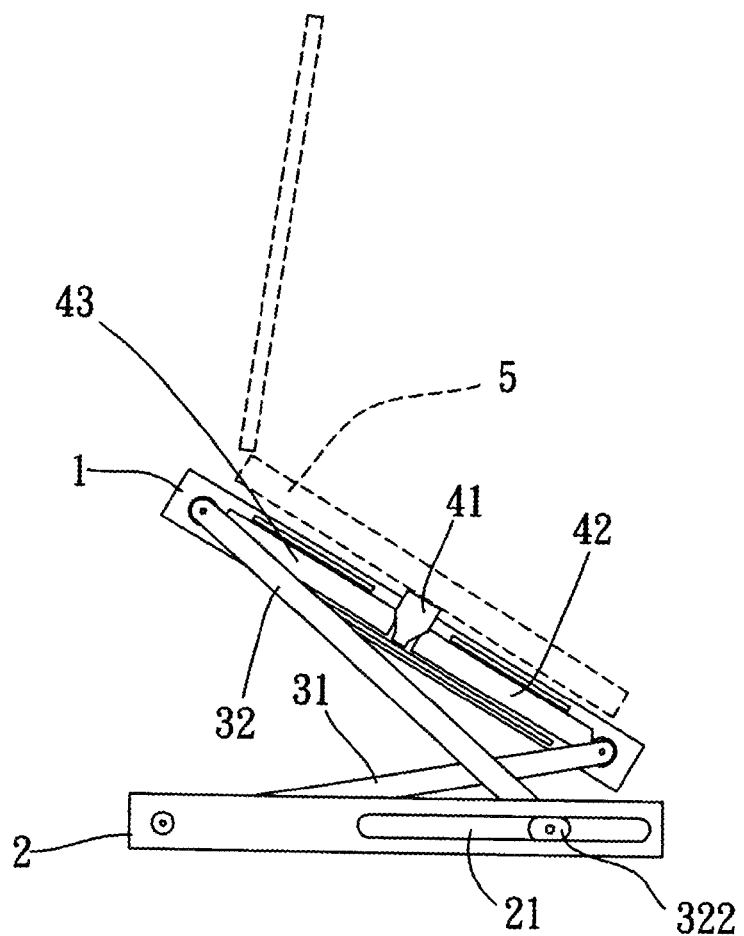
FIG. 3 is a schematic drawing of the present invention, showing an application example of the adjustable notebook computer support.

Referring to FIGS. 1~3, an adjustable notebook computer support in accordance with the present invention is adapted to support a notebook computer 5 on a surface; it comprises a carrier member 1, a base member 2, a linking unit 3, and a braking unit 4.

The carrier member 1 is adapted to carry a notebook computer 5 and to hold it in place. The carrier member 1 has two guide rails 11 extending along its length.

The base member 2 has a sliding slot 21 extending along its length.

The linking unit 3 comprises a first link 31 and a second link 32. The first link 31 has a first end 311 coupled to the carrier member 1, and a second end 312 pivoted to one end of the base member 2. The first end 311 of the first link 31 is fixedly provided with a gear 313 that is turnable with the first link 31 relative to the carrier member 1. The second link 32 has a first end 321 pivoted to one end of the carrier member 1, and a second end 322 coupled to and movable along the sliding slot 21 of the base member 2. The first end 321 of the second link 32 is fixedly provided with a gear 323 that is turnable with the second link 32 relative to the carrier member 1 to adjust the position and angle of the carrier member 1 relative to the base member 2.

The braking unit 4 is operable between a locking position and an unlocking position. According to the present preferred embodiment, the braking unit 4 comprises a control key 41, a first operating bar 42, a second operating bar 43, a first spring member 44, and a second spring member 45. The operating key 41 is movable in vertical direction, having a first bevel guide edge 411 and a second bevel guide edge 412. The first operating bar 42 and the second operating bar 43 are movable between the two guide rails 11 along the length of the carrier member 1. The first operating bar 42 has a toothed first end 421 engaged with the gear 313 of the first link 31, and a beveled second end 422 matching the first beveled guide edge 411 of the control key 41. The first spring member 44 has two opposite ends respectively connected to the first operating bar 42 and the carrier member 1 to pull the first operating bar 42 toward the control key 41, keeping the beveled second end 422 of the first operating bar 42 in close contact with the first beveled guide edge 411 of the control key 41. The second operating bar 43 has a toothed first end 431 engaged with the gear 323 of the second link 32, and a beveled second end 432 matching the second beveled guide edge 412 of the control key 41. The first spring member 45 has two opposite ends respectively connected to the second operating bar 43 and the carrier member 1 to pull the second operating bar 43 toward the control key 41, keeping the beveled second end 432 of the second operating bar 43 in close contact with the second beveled guide edge 412 of the control key 41.

When the braking unit 4 is in the unlocking position, the control key 41 is in a top position, the first operating bar 42 and the second operating bar 43 are kept close to the control key 41, and the toothed first end 421 of the first operating bar 42 and the toothed first end 431 of the second operating bar 43 are respectively disengaged from the gear 313 of the first link 31 and the gear 323 of the second link 32, allowing adjustment of the elevation and tilting angle of the carrier member 1 relative to the base member 2.

To lock the carrier member 1 and the base member 2, push the control key 41 downward from the top (unlocking) position to the bottom (locking position). At this time, the first beveled guide edge 411 and second beveled guide edge 412 of the control key 41 are respectively forced against the beveled second end 422 of the first operating bar 42 and the beveled second end 432 of the second operating bar 43 to move the first operating bar 42 toward the first link 31 and the second operating bar 43 toward the second link 32, thereby forcing the toothed first end 421 of the first operating bar 42 into engagement with the gear 313 of the first link 31 and the toothed first end 431 of the second operating bar 43 into engagement with the gear 323 of the second link 32, and therefore the first link 31 and the second link 32 are locked to the carrier member 1.

Based on the aforesaid design, the user needs only to control the control key 41 between the locking position and the unlocking position when adjusting the elevation and tilting angle of the notebook computer 5 according to personal requirement. When the adjustable notebook computer support is in the received condition, as shown in FIG. 2, the adjustable notebook computer support keeps the notebook computer spaced above the surface on which the adjustable notebook computer support is supported, leaving a space beneath the notebook computer for heat dissipation.

Although particular embodiments of the invention have been described in detail for purposes of illustration, various modifications and enhancements may be made without departing from the spirit and scope of the invention. Accordingly, the invention is not to be limited except as by the appended claims.

The invention claimed is:

1. An adjustable notebook computer support, comprising:
a carrier member for holding a notebook computer;
a base member, said base member having a sliding slot;
a linking unit, said linking unit comprising a first link and a second link, said first link having a first end pivoted to said carrier member, a second end pivoted to one end of said base member, and a gear fixedly provided at the first end thereof, said second link having a first end pivoted to one end of said carrier member, a second end coupled to and movable along said sliding slot of said base member, and a gear fixedly provided at the first end thereof; and
a braking unit movable between an unlocking position for allowing adjustment of the elevation and angle of said inking unit relative to said carrier member and a locking position where said first link and said second link are locked to said carrier member, wherein said braking unit comprises a first operating bar and a second operating bar, said first operating bar having a toothed first end engageable with the gear of said first link, said second operating bar having a toothed first end engageable with the gear of said second link, the toothed first ends of said first operating bar and said second operating bar being respectively disengaged from the gears of said first link and said second link when said braking unit is in said unlocking position, the toothed first ends of said first operating bar and said second operating bar being respectively engaged with the gears of said first link and said second link when said braking unit is in said locking position.

2. The adjustable notebook computer support as claimed in claim 1, wherein said braking unit further comprises a control key, a first spring member and a second spring member, said control key having a first beveled guide edge and a second beveled guide edge; said first operating bar having a beveled second end remote from the gear of said first operating bar and kept in contact with said first beveled guide edge of said control key, said second operating bar having a beveled second end remote from the gear of said second operating bar and kept in contact with said second beveled guide edge of said control key, said first spring member being connected with said first operating bar to hold the beveled second end of said first operating bar in contact with said first beveled guide edge of said control key, said second spring member being connected with said second operating bar to hold the beveled second end of said second operating bar in contact with said second beveled guide edge of said control key, said first beveled guide edge and said second beveled guide edge of said control key respectively imparting a pressure to the beveled second end of said first operating bar and the beveled second end of said second operating bar to stop said first operating bar and said second operating bar against said first link and said second link when said braking unit is in said locking position.

3. The adjustable notebook computer support as claimed in claim 2, wherein said carrier member comprises two parallel guide rails; and said first operating bar and said second operating bar are supported between and movable along said guide rails.

* * * * *